United States Patent

Hamai

[11] 4,237,827
[45] Dec. 9, 1980

[54] SWIRL-CHAMBER DIESEL ENGINE WITH PISTON FORMED WITH CURVED GROOVE AT ITS CROWN

[75] Inventor: Kyugo Hamai, Yokosuka, Japan

[73] Assignee: Nissan Motor Company, Limited, Yokohama, Japan

[21] Appl. No.: 941,203

[22] Filed: Sep. 11, 1978

[30] Foreign Application Priority Data

Dec. 19, 1977 [JP] Japan .................. 52-152715

[51] Int. Cl.³ .................................. F02B 19/08
[52] U.S. Cl. ................................ 123/262; 123/269
[58] Field of Search .......... 123/30 C, 30 D, 32 A, 123/32 B, 32 C, 32 D, 191 C, 191 S, 193 P, 188 M, 32 SP

[56] References Cited

U.S. PATENT DOCUMENTS

| | | | |
|---|---|---|---|
| 2,935,054 | 5/1960 | Franke et al. | 123/32 D |
| 3,270,733 | 9/1966 | Steidler | 123/30 C |
| 3,408,994 | 11/1968 | Kraus | 123/30 C |
| 3,797,466 | 3/1974 | Nambu | 123/191 S |
| 3,924,580 | 12/1975 | Taira et al. | 123/30 C |
| 3,924,584 | 12/1975 | Decker | 123/32 SP |
| 4,063,537 | 12/1977 | Lampredi | 123/30 D |

FOREIGN PATENT DOCUMENTS

| | | | |
|---|---|---|---|
| 410692 | 3/1925 | Fed. Rep. of Germany | 123/30 C |
| 930498 | 7/1963 | United Kingdom | 123/32 B |
| 1478013 | 6/1977 | United Kingdom | . |

*Primary Examiner*—Charles J. Myhre
*Assistant Examiner*—Andrew M. Dolinar
*Attorney, Agent, or Firm*—Schwartz, Jeffery, Schwaab, Mack, Blumenthal & Koch

[57] ABSTRACT

The invention relates to a swirl-chamber Diesel engine. A swirl-chamber Diesel engine is disclosed which has a piston formed with a curved groove at its crown and in which a communicating passage, between a main combustion and a swirl chamber, connects tangentially into the swirling air charge within the main combustion chamber. The curved groove has one end which, when the piston is on its top dead center, communicates with the swirl chamber through the communicating passage. It is curved generally along the swirling air charge and has an opposite end widened and arranged so as to direct the subsequent combustion gases toward the center of the main combustion chamber and permit them to diffuse thereabout. With this arrangement, the swirling air charge within the main combustion chamber and the penetrating force of the subsequent combustion gases entering into the main combustion chamber from the communicating passage are fully utilized to encourage the feeding of air to the fuel.

7 Claims, 5 Drawing Figures

SWIRL-CHAMBER DIESEL ENGINE WITH PISTON FORMED WITH CURVED GROOVE AT ITS CROWN

BACKGROUND OF THE INVENTION

The present invention relates to swirl-chamber Diesel engines.

A swirl-chamber Diesel engine is one in which, during compression stroke of a reciprocating piston, charged air in a main combustion chamber arranged in a cylinder is compressed so that part thereof is forced into a swirl chamber through a communicating passage, generating swirl therein; fuel is injected into the swirling air in the swirl chamber and ignited by the heat within the swirl chamber; and the combustion product resulting from the combustion in the swirl chamber, which includes burning flame and fuel droplets, enters into the main combustion chamber through the communicating passage, evaporating the fuel droplets to facilitate a so-called diffusion burning. A known swirl-chamber Diesel engine includes a cylinder block, a piston reciprocally movable in a cylinder formed in the cylinder block, and a cylinder head secured to the cylinder block to close the cylinder so that a main combustion chamber is formed in the cylinder between the crown of the piston and the cylinder head. The cylinder head has formed therein a swirl chamber communicating with the main combustion chamber through a communicating passage also formed through the cylinder head. The passage is so shaped and inclined as to permit, during the compression stroke of the piston, part of the charged air in the main combustion chamber to enter into the swirl chamber along a line tangent to the swirl chamber wall thereby to generate swirl in the swirl chamber. A fuel injection nozzle is mounted to the cylinder head with its spout or spray tip communicating with the swirl chamber. The fuel injection nozzle points to the swirl chamber wall disposed adjacent to a shoulder section defining part of the swirl chamber wall and is inclined such that a jet of fuel injected may be directed along the swirl within the swirl chamber and may not enter directly into the main combustion chamber through the communicating passage. A heater plug or glow plug extends into the swirl chamber to produce heat close to the jet of fuel injected to give a starting air. In order to evenly diffuse the fuel droplets and combustion products or flame entering into the main combustion chamber from the swirl chamber through the spout passage, the piston is formed at its crown with a depression consisting of cup-shaped cavities communicating at their junctions with the swirl chamber.

In a swirl-chamber Diesel engine, in order to facilitate evaporation of the fuel droplets entering into a main combustion chamber through a communicating passage and to prevent carbonization of the fuel droplets owing to their thermal decomposition with insufficient oxygen, it is desired to design the combustion chamber so that sufficient oxygen may be present around every fuel droplets. This is one of the effective measures to reduce emissions of smoke.

SUMMARY OF THE INVENTION

It is an object of the present invention to improve a swirl-chamber Diesel engine by facilitating the evaporation of fuel droplets entering into a main combustion chamber from a swirl chamber through a communicating passage and evenly dissipating the fuel droplets within the main combustion chamber so that sufficient amount of air may exist or surround each of the fuel droplets.

It is a more practical object of the present invention to improve a swirl-chamber Diesel engine so as to meet demands for subcompact passenger car use.

BRIEF DESCRIPTION OF THE ACCOMPANYING DRAWINGS

DESCRIPTION OF THE PREFERRED EMBODIMENT

Figure 1:
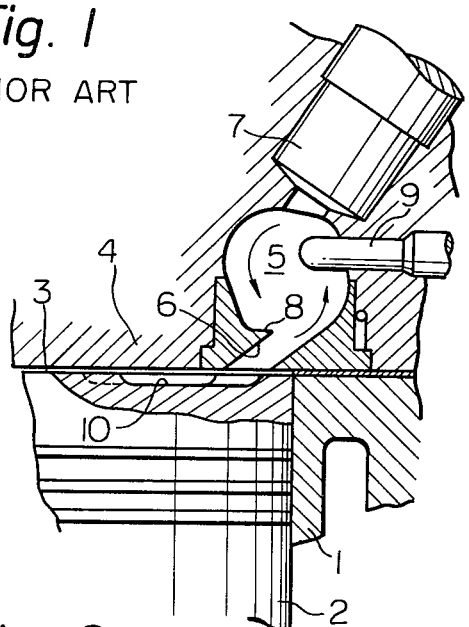
FIG. 1 is a partial sectional view of a conventional swirl-chamber Diesel engine.

Before entering into the description of the preferred embodiment of the present invention, the conventional swirl-chamber Diesel engine will be explained in connection with FIGS. 1 and 2 so as to make clear the feature of the invention over the prior art.

A swirl chamber Diesel engine shown in these Figures comprises a cylinder block 1, a piston 2 reciprocally movable in a cylinder formed in the cylinder block 1 and a cylinder head 4 secured to the cylinder block 1 to close the cylinder so that a main combustion chamber 3 is formed in the cylinder between the crown of the piston 2 and the cylinder head 4. The cylinder head 4 has formed therein a swirl chamber 5 communicating with the main combustion chamber 3 through a communicating passage 6 also formed through the cylinder head 4. The passage 6 is so shaped and inclined as to permit, during the compression stroke of the piston 2, part of air charge within the main combustion chamber 3 to enter into the swirl chamber 5 along a line tangent to the swirl chamber wall thereby to generate swirl in the swirl chamber 5. A fuel injector or injection nozzle 7 is mounted to the cylinder head 4 with its spout or spray tip communicating with the swirl chamber 5. The fuel injection nozzle 7 points to the swirl chamber 5 wall disposed adjacent a shoulder 8 and is inclined such that a jet of fuel injected from the injection nozzle 7 may be directed along the swirl of air within the swirl chamber 5 and may not enter directly into the main combustion chamber 3. A heater plug or glow plug 9 extends into the swirl chamber 5 to produce heat close to the fuel providing a starting aid. The piston 2 is formed at its crown with a depression 10 of a part-circular design. This depression 10, when the piston 2 is on its top dead center, forms part of the complete combustion chamber. It consists of two cup-shaped cavities communicating at their junctions with the swirl chamber 5. The paths of the air movements in these cavities are shown by the arrows in FIG. 2. By dividing the subsequent combustion gases flow from the communicating passage 6 into two streams flowing around the cup-shaped cavities, some degree of air swirl during combustion is generated outside the swirl chamber 5; this encourages the feeding of fresh air to the emerging fuel.

Figure 2:
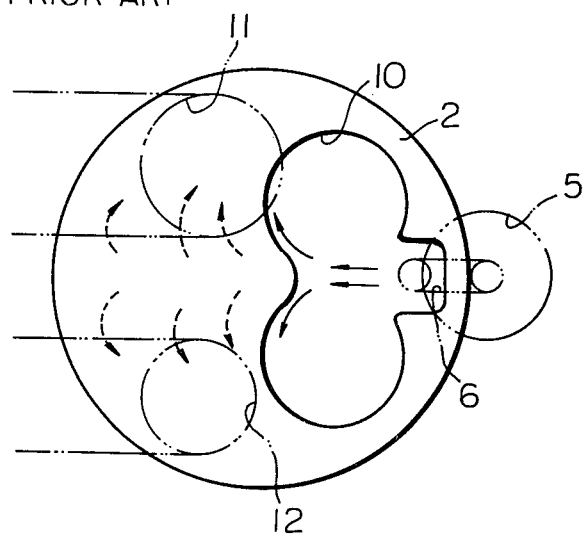
FIG. 2 is a cross sectional view of the engine of FIG. 1.

The problem to be solved is that, in the engine shown in FIGS. 1 and 2, swirl of air charge within the main combustion chamber 3 is not effectively used to distribute the fuel droplets and flame entering from the communicating passage 6 and the penetration force of the combustion gases from the communicating passage 6 will be damped and not effectively utilized to give aid to the distribution of the fuel droplets and flame within the main combustion chamber. Thus, the combustion system of this conventional engine is unsatisfactory in making full use of air within the main combustion chamber 3 for burning the fuel droplets.

A preferred embodiment of a swirl-chamber Diesel engine constructed according to the present invention will be described in connection with FIGS. 3 to 5 in which the same reference numerals as used in FIGS. 1 and 2 are used to designate similar parts for ease of appreciation of the invention over the prior art.

Figure 3:
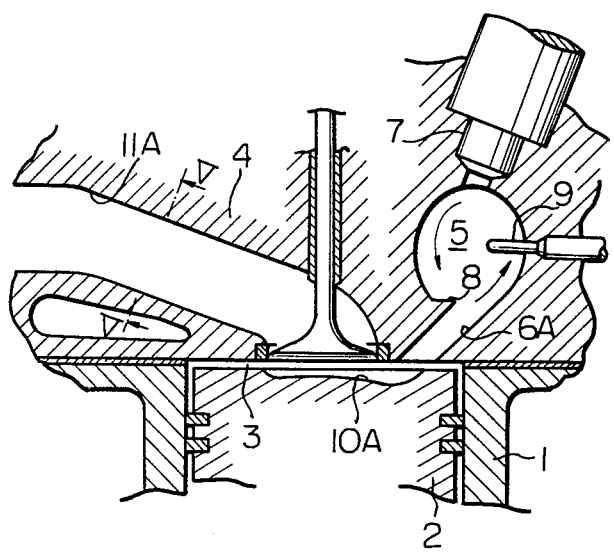
FIG. 3 is a partial sectional view of a preferred embodiment of a swirl-chamber Diesel engine according to the present invention.
Figure 4:
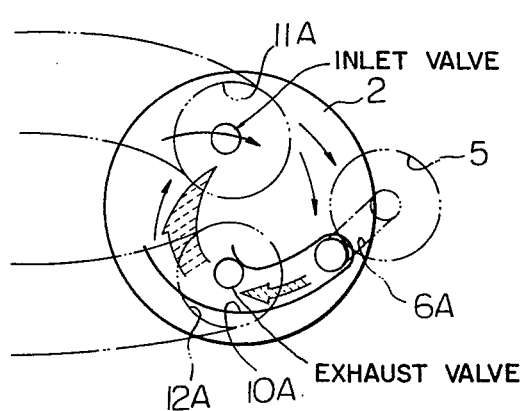
FIG. 4 is a cross sectional view of the engine of FIG. 3.
Figure 5:
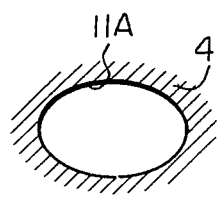
FIG. 5 is a sectional view taken through the line V—V of FIG. 3.

As shown in FIGS. 3 to 5, an intake passage 11A is generally tangentially inclined to a main combustion chamber 3, as viewed in plan view as shown in FIG. 4, so as to create the rotational swirl of the intake air charge. Viewing in FIG. 3, the intake passage 11A connects to the main combustion chamber 3 at a low or small angle, with respect to a horizontal plane perpendicular to the cylinder axis, and is flattened as shown in FIG. 5 to provide an oval cross section, in order to strengthen or inverse the rotational swirl of the intake air charge to such an extent that some degree of the rotational swirl of the air exists within the main combustion chamber 3 when the combustion gases enter into the main combustion chamber 3 from a communicating passage 6A. Although, in this embodiment, the intake passage 11A is curved as its connects with the main combustion chamber 3, viewing in FIG. 4, an intake passage which is straight as its connects the main combustion chamber, viewing in FIG. 4 may be used as an alternative as far as it connects tangentially to the main combustion chamber 3, although not shown.

The communicating passage 6A connects tangentially to the main combustion chamber 3, viewing in FIG. 4, so that the subsequent combustion gases, which flow from the communicating passage 6A into the main combustion chamber 3, is now directed more or less tangentially into the swirling air charge within the main combustion chamber 3 and along the direction of the swirl. A piston 2 has at its top end or crown a depression or curved groove 10A which, when the piston 2 is on its top dead center, communicates at its one end with a swirl chamber 5 through the communicating passage, as shown in FIGS. 3 and 4. The groove 10A is curved generally along the arrows of the swirling air charge within the main combustion chamber 3 and has an opposite end widened and arranged so as to direct the subsequent combustion gases toward the center of the main combustion chamber 3 and permit them to diffuse thereabout. The depth of the groove 10A gradually increases as approaching the end at which the communicating passage 6A communicates when the piston 2 is on its top center and becomes maximum there so as to provide a squish which helps to strengthen swirling of air within the swirl chamber 5.

In operation of the Diesel engine constructed as previously described, during the intake stroke of the piston 2 the intake air will flow via the intake passage 11A into an upper area of the main combustion chamber 3 with a small inclined angle and tangentially with respect to the cylinder wall, thus generating a strong swirling of the intake air charge within the main combustion chamber 3. During the subsequent compression stroke of the piston 2, the swirling air charge within the main combustion chamber 3 will be compressed so that part thereof will flow into the swirl chamber 5 under the squish effect, generating strong swirl therein. The temperature of the air within the swirl chamber 5 is elevated high owing to the swirling action. Fuel is injected from the fuel nozzle 9 into the swirling air charge within the swirl chamber 5, diffusing into fuel droplets within the swirling air to be ignited. The burning product then flows into the main combustion chamber 3 through the communicating passage 6A together with unburnt fuel droplets. The burning product with unburnt fuel droplets from the communicating passage 6A is injected or directed into the main combustion chamber 3 in the same direction as the swirling direction of the remaining air swirl within the main combustion chamber 3. Because the groove 10A runs and is curved generally along the flow line of the swirling of air in the main combustion chamber 3 and the burning product and unburnt fuel are directed into the groove 10A along the curved side wall thereof, the penetrating force of the injection of the burning combustion product and fuel droplets from the passage 6A is not decreased much and is fully utilized to increase the fluid flow or movement along the groove 10A. The burning product with unburnt fuel droplets diffuse at the center area of the main combustion chamber. As a result, fluid flow or movement within the main combustion chamber 3 is increased appreciably, as compared to the case in the engine shown in FIGS. 1 and 2, thus making it possible to utilize to the full extent the air within the main combustion chamber 3 and to promote evaporation of the unburned fuel droplets to cause efficient diffusion burning within the main combustion chamber 3.

Owing to the increased efficiency of the diffusion burning, the concentration of smoke resulting from the carbonization of the unburnt fuel droplets has been decreased, the formation of unburnt products such as HC has been suppressed and an increase in the engine power output and an improvement in the fuel economy have been achieved, too. These advantages are particularly apparent during the engine operation under light load where in the conventional engine motion of fluid within the combustion chamber is weak and air within the combustion chamber is not effectively utilized for burning of the unburnt fuel droplets. Therefore, emission of smoke and drop in engine power output during light load engine operating condition have been decreased according to the invention.

Touching upon the arrangement of an exhaust valve it is advantageous in increasing the scavenging efficiency to open the exhaust port 12A above the groove 10A. With this port arrangement, it is recognized that there is a gain in engine power output and fuel economy.

Alternatively, an air intake passage as shown in FIG. 2 may be used instead of the air intake passage 11A.

It will now be understood that according to the invention diffusion burning within a Diesel engine has been activated over the all engine operating conditions, thus increasing the engine power output and engine performance over the all engine operating conditions, moreover, the concentration of smoke has been decreased and the unburnt products such as HC have been decreased. Thus, the invention provide a practical solution to the problem encountered in the conventional Diesel engines.

What is claimed is:

1. A swirl-chamber Diesel engine comprising:
   a cylinder block having a cylinder;
   a piston reciprocally movable in said cylinder;
   a cylinder head secured to said cylinder block to close said cylinder to form in said cylinder a main combustion chamber between said cylinder head and said piston;
   an intake arrangement comprising means for swirling an air charge within the main combustion chamber;
   said cylinder head having a swirl chamber therein and a communicating passage interconnecting said swirl chamber and said main combustion chamber;
   a fuel injector to inject fuel into said swirl chamber;
   said communicating passage being so shaped and inclined with respect to said swirl chamber as to permit, during the compression stroke of said piston, part of said air charge within the main combustion chamber to enter into said swirl chamber to generate swirl in said swirl chamber;
   said communicating passage connecting tangentially into said main combustion chamber so as to direct combustion gases resulting from the combustion within said swirl chamber along with said swirl of air charge within said main combustion chamber; and
   said piston having at a crown thereof a curved groove having one end which, when said piston is at top dead center, communicates with said swirl chamber through said communicating passage, said curved groove being curved generally along with said swirl of air charge within said main combustion chamber and having an opposite end widened, said curved groove comprising means for directing said combustion gases to circle around the axis of said cylinder in a direction substantially concurrent with the swirl of said air charge in said combustion chamber.

2. A swirl-chamber Diesel engine as claimed in claim 1, in which
   said intake arrangement includes an intake passage connecting into said main combustion chamber at a small angle, with respect to a horizontal plane perpendicular to the cylinder axis, and having an oval cross section.

3. A swirl-chamber Diesel engine as claimed in claim 1, in which
   the depth of said curved groove gradually increases as approaching said one end.

4. A swirl-chamber Diesel engine as claimed in claim 1, including an exhaust arrangement having an exhaust port disposed in said cylinder head opposite said groove.

5. In a diesel engine:
   means defining a cylinder;
   a piston reciprocatively disposed in said cylinder to define a variable volume main combustion chamber;
   means for defining an intake passage and for introducing air into said main combustion chamber substantially tangential with respect to the wall of said cylinder so that the air swirls in said main combustion chamber;
   an intake valve disposed in said intake passage for controlling the fluid communication between said passage and said main combustion chamber;
   means defining a swirl chamber and a communicating passage leading from said main combustion chamber to said swirl chamber, said communicating passage being oriented with respect to said swirl chamber so as to induce a swirling air pattern in said swirl chamber upon said piston approaching TDC, and oriented with respect to said main combustion chamber so as to direct a flame, issuing from said swirl chamber, at an angle substantially tangential with respect to said cylinder wall so that the flame tends to swirl in the same direction as the air from said intake passage;
   a fuel injector disposed in said swirl chamber for injecting fuel thereinto;
   a glow plug disposed in said swirl chamber for heating the air-fuel mixture which swirls therein; and
   means defining a curved groove in the crown of said piston, said groove originating in said crown substantially at the place where the flame from said swirl chamber impinges on said crown, said groove curving toward the center of said crown, said groove comprising means for leading said flame to circle the geometric center of the combustion chamber concurrent with the swirl of air therein.

6. A diesel engine as claimed in claim 5, further comprising:
   means defining an exhaust passage leading from said main combustion chamber and originating above said groove in the direction of piston travel; and
   an exhaust valve for controlling fluid communication between said main combustion chamber and said exhaust passage.

7. A diesel engine as claimed in claim 5, wherein said groove becomes shallower and wider as it leads away from its point of origin.

* * * * *